US011238497B2

(12) United States Patent
Brown et al.

(10) Patent No.: US 11,238,497 B2
(45) Date of Patent: Feb. 1, 2022

(54) LOCAL BUSINESS ACCESS USING GEOFENCE

(71) Applicant: Ford Global Technologies, LLC, Dearborn, MI (US)

(72) Inventors: Andrew Brown, Farmington Hills, MI (US); Keith Weston, Canton, MI (US); Joshua Sharpe, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 244 days.

(21) Appl. No.: 16/276,898

(22) Filed: Feb. 15, 2019

(65) Prior Publication Data
US 2020/0265474 A1    Aug. 20, 2020

(51) Int. Cl.
*G06Q 30/00* (2012.01)
*G06Q 30/02* (2012.01)
*G01C 21/36* (2006.01)

(52) U.S. Cl.
CPC ..... *G06Q 30/0261* (2013.01); *G01C 21/3697* (2013.01); *G06Q 30/0265* (2013.01); *G06Q 30/0266* (2013.01); *G06Q 30/0267* (2013.01); *G06Q 30/0282* (2013.01)

(58) Field of Classification Search
None
See application file for complete search history.

(56) References Cited

U.S. PATENT DOCUMENTS

| | | | | |
|---|---|---|---|---|
| 6,360,167 | B1* | 3/2002 | Millington | G01C 21/26 |
| | | | | 342/357.31 |
| 6,505,118 | B2* | 1/2003 | Chowanic | G01C 21/3484 |
| | | | | 340/906 |
| 6,526,335 | B1* | 2/2003 | Treyz | H04W 4/029 |
| | | | | 701/1 |
| 6,738,711 | B2* | 5/2004 | Ohmura | G08G 1/096775 |
| | | | | 701/451 |
| 9,183,571 | B2* | 11/2015 | Kansal | G06Q 30/0261 |
| 9,204,251 | B1* | 12/2015 | Mendelson | G06Q 20/327 |
| 9,436,956 | B2* | 9/2016 | Jaramillo | G06Q 30/0631 |
| 10,405,152 | B1* | 9/2019 | Prabhudeva | H04W 4/40 |
| 10,810,621 | B2* | 10/2020 | Falconer | B60K 35/00 |
| 2002/0032035 | A1* | 3/2002 | Teshima | G09F 21/04 |
| | | | | 455/456.3 |
| 2002/0095333 | A1* | 7/2002 | Jokinen | G06Q 30/0207 |
| | | | | 705/14.26 |
| 2003/0220835 | A1* | 11/2003 | Barnes, Jr. | H04M 1/724 |
| | | | | 705/14.36 |
| 2004/0224703 | A1* | 11/2004 | Takaki | H04W 4/02 |
| | | | | 455/457 |
| 2005/0192008 | A1* | 9/2005 | Desai | G06F 21/604 |
| | | | | 455/435.2 |
| 2005/0216511 | A1* | 9/2005 | Umezu | G01C 21/3682 |
| 2006/0286989 | A1* | 12/2006 | Illion | G06Q 30/02 |
| | | | | 455/456.3 |

(Continued)

*Primary Examiner* — Luis A Brown
(74) *Attorney, Agent, or Firm* — Michael Spenner; Brooks Kushman P.C.

(57) ABSTRACT

A vehicle includes one or more controllers, programmed to responsive to detecting a vehicle location within a geofence of a first entity, qualify the first entity as one of business candidates to display to a screen; responsive to receiving a promotion from one or more of the business candidates, output the promotion; and responsive to receiving a user input, place a reservation to one of the business candidates.

16 Claims, 5 Drawing Sheets

(56) References Cited

U.S. PATENT DOCUMENTS

| | | | |
|---|---|---|---|
| 2007/0010942 A1* | 1/2007 | Bill | G01C 21/3617 701/424 |
| 2007/0271035 A1* | 11/2007 | Stoschek | G01C 21/3697 701/533 |
| 2009/0006194 A1* | 1/2009 | Sridharan | G06Q 30/0273 705/14.62 |
| 2011/0034147 A1* | 2/2011 | Issa | H04M 1/72457 455/410 |
| 2011/0087427 A1* | 4/2011 | Liu | G01C 21/3679 701/532 |
| 2011/0178811 A1* | 7/2011 | Sheridan | H04W 4/024 705/1.1 |
| 2012/0232978 A1* | 9/2012 | Steul | H04W 4/50 705/14.25 |
| 2013/0173358 A1* | 7/2013 | Pinkus | G06Q 30/0265 705/14.1 |
| 2014/0032296 A1* | 1/2014 | Jaramillo | G06Q 40/04 705/14.25 |
| 2014/0156410 A1* | 6/2014 | Wuersch | G06Q 30/0261 705/14.58 |
| 2014/0257989 A1* | 9/2014 | Prakah-Asante | G01C 21/3697 705/14.63 |
| 2014/0279021 A1* | 9/2014 | MacNeille | G06Q 30/0266 705/14.63 |
| 2015/0199612 A1* | 7/2015 | Segall | G06N 5/04 706/52 |
| 2016/0117926 A1* | 4/2016 | Akavaram | B60W 40/09 340/932.2 |
| 2016/0180394 A1* | 6/2016 | Tseng | G06Q 30/0277 705/14.58 |
| 2016/0189439 A1* | 6/2016 | Vetterick | G06Q 30/0261 701/29.4 |
| 2016/0210711 A1* | 7/2016 | Krupa | G16H 40/63 |
| 2017/0225677 A1* | 8/2017 | Yoshida | B60W 30/025 |
| 2017/0356749 A1* | 12/2017 | Shelby | G01C 21/3407 |
| 2017/0357916 A1* | 12/2017 | Shelby | G01C 21/3667 |
| 2018/0060912 A1* | 3/2018 | Silvestro | G06Q 30/0261 |
| 2018/0075469 A1* | 3/2018 | Dichiara | G06Q 30/0267 |
| 2018/0082315 A1* | 3/2018 | Smid | G01C 21/362 |
| 2018/0253778 A1* | 9/2018 | Nishizawa | G06Q 10/10 |
| 2018/0253805 A1* | 9/2018 | Kelly | G06Q 20/322 |
| 2019/0050887 A1* | 2/2019 | Nelsen | G06Q 30/0201 |
| 2019/0257665 A1* | 8/2019 | Friedman | G01C 21/3679 |
| 2020/0151761 A1* | 5/2020 | Wieker | G06Q 30/0267 |
| 2020/0258123 A1* | 8/2020 | Kobayashi | G06Q 30/0259 |
| 2020/0265474 A1* | 8/2020 | Brown | G01C 21/3682 |
| 2020/0334592 A1* | 10/2020 | Garg | G06Q 30/0251 |

\* cited by examiner

LOCAL BUSINESS ACCESS USING GEOFENCE

TECHNICAL FIELD

The present disclosure generally relates to a vehicle system for allowing users to access local business information.

BACKGROUND

Many vehicles are provided with infotainment systems integrated with map and telecommunication features. Vehicle users may access the internet via the infotainment system to access information of a point-of-interest (POI) displayed on the map. For instance, when a user searches for a business such as a restaurant, he/she may activate the map feature and manually search by the type of business. A list of businesses may be displayed on a screen. To access more detailed information of the business such as phone numbers or hours, the user may need to manually retrieve the information via the internet.

SUMMARY

In one or more illustrative embodiment of the present disclosure, a vehicle includes one or more controllers, programmed to responsive to detecting a vehicle location within a geofence of a first entity, qualify the first entity as one of business candidates to display to a screen; responsive to receiving a promotion from one or more of the business candidates, output the promotion; and responsive to receiving a user input, place a reservation to one of the business candidates.

In one or more illustrative embodiment of the present disclosure, a method for a vehicle includes responsive to detecting a vehicle location within a geofence of a first business entity, qualifying the first business entity as one of business candidates; displaying one or more business candidates on a display; collecting a vehicle user information from a mobile device wirelessly connected to the vehicle, the user information includes at least one of: business membership of the vehicle user, or business customer credits/rewards of the vehicle user; sending the vehicle user information to one or more of the business candidates via a cloud; and responsive to receiving a customized promotion from the one or more of the business candidates, outputting the customized promotion to the vehicle user.

In one or more illustrative embodiment of the present disclosure, a non-transitory computer readable medium includes instructions, when executed by a processor of a vehicle, making the vehicle to responsive to detecting a business entity is located within a geofence defined by the vehicle and by a navigation route of the vehicle, qualify the business entity as one of business candidates; display one or more business candidates on a display; responsive to receiving a customized promotion from one or more of the business candidates, output the customized promotion; and responsive to receiving a user input; place a reservation to one of the business candidates.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a vehicle infotainment system allowing users to access local business information. More specifically, the present disclosure proposes a system allowing vehicle users to more easily access information about businesses located within a geofence.

Figure 1:
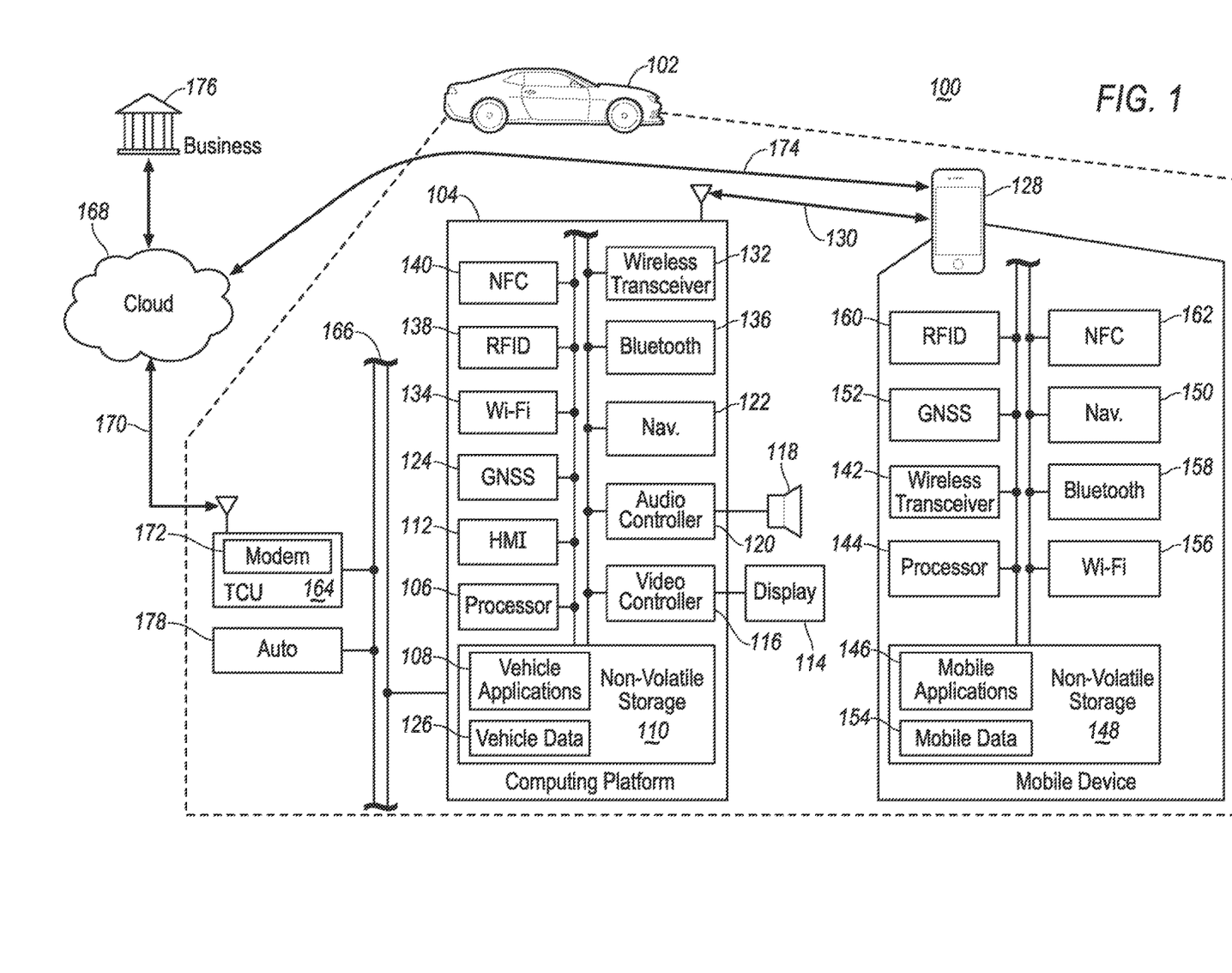
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be battery electric vehicle (BEV), a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, wireless communications and online reservations. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 112 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more speakers 118 configured to provide audio output to vehicle occupants by way of an audio controller 120.

The computing platform 104 may also be provided with navigation and route planning features through a navigation controller 122 configured to calculate navigation routes responsive to user input via e.g., the HMI controls 112, and output planned routes and instructions via the speaker 118 and the display 114. Location data that is needed for navigation may be collected from a global navigation satellite system (GNSS) controller 124 configured to communicate with multiple satellites and calculate the location of the vehicle 102. The GNSS controller 124 may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 126. Navigation software may be stored in the storage 110 as a part of the vehicle applications 108.

The computing platform 104 may be configured to wirelessly communicate with a mobile device 128 of the vehicle users/occupants via a wireless connection 130. The mobile device 128 may be any of various types of portable computing device, such as cellular phones, tablet computers, wearable devices, smart watches, laptop computers, portable music players, or other device capable of communication with the computing platform 104. A wireless transceiver 132 may be in communication with a Wi-Fi controller 134, a Bluetooth controller 136, a radio-frequency identification (RFID) controller 138, a near-field communication (NFC) controller 140, and other controllers such as a Zigbee transceiver, an IrDA transceiver (not shown), and configured to communicate with a compatible wireless transceiver 142 of the mobile device 128.

The mobile device 128 may be provided with a processor 144 configured to execute instructions of mobile applications 146 to perform instructions, commands, and other routines in support of the processes such as navigation, telephone, wireless communication, and multi-media processing. The mobile applications may be stored in a non-volatile storage medium 148 of the mobile device 128. For instance, the mobile device 128 may be provided with location and navigation functions via a navigation controller 150 and a GNSS controller 152. Map data needed for navigation may be stored in the storage 148 as a part of mobile data 154. The mobile device 128 may be provided with a wireless transceiver 142 in communication with a Wi-Fi controller 156, a Bluetooth controller 158, a RFID controller 160, a NFC controller 162, and other controllers (not shown), configured to communicate with the wireless transceiver 132 of the computing platform 104.

The computing platform 104 may be further configured to communicate with a telematics control unit (TCU) 164 via one or more in-vehicle network 166. The in-vehicle network 166 may include, but is not limited to, one or more of a controller area network (CAN), an Ethernet network, and a media-oriented system transport (MOST), as some examples.

The TCU 164 may be configured to control telecommunication between vehicle 102 and a cloud 168 through a wireless connection 170 using a modem 172. The term cloud is used as a general term in the present disclosure and may include any computing network involving computers, servers, controllers or the like configured to perform data processing functions and facilitate communication between various parties. The wireless connection 170 may involve or utilize any type of wireless network such as a cellular network enabling the communication between the computing platform 104 and the cloud 168 as well as other parties. The mobile device 128 may be further provided telecommunication features configured to communicate with the cloud 168 via a wireless connection 174 via telecommunication components such as a modem (not shown). In this way, the mobile device 128 may be configured to communicate with the computing platform 104 of the vehicle 102 via the cloud 168 in addition to or in lieu of the wireless connection 130. The TCU 164 and/or the mobile device 128 may be further configured to communicate with a business entity 176 via the cloud 168. The business entity 176 may include any person or entity involved in any type of business transactions. For instance, the business entity 176 may be a restaurant or food service provider. The computing platform 104 may be configured to communicate with the cloud 168 to retrieve information about the business entity 176 including hours, current waiting time, contact, or promotions as a few non-limiting examples.

Figure 2A:
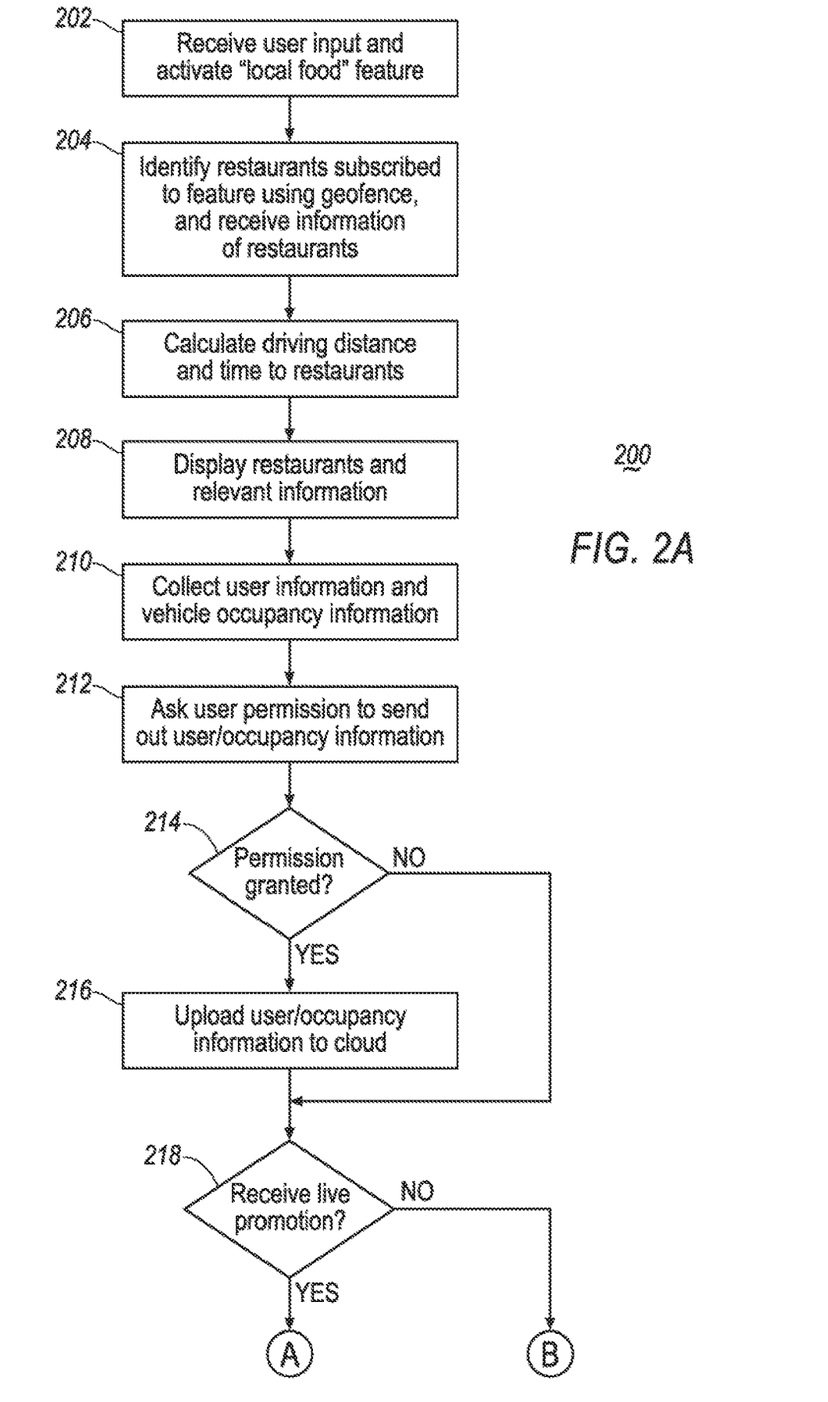
FIGS. 2A and 2B illustrate an example flow diagram for a process of one embodiment of the present disclosure.
Figure 2B:
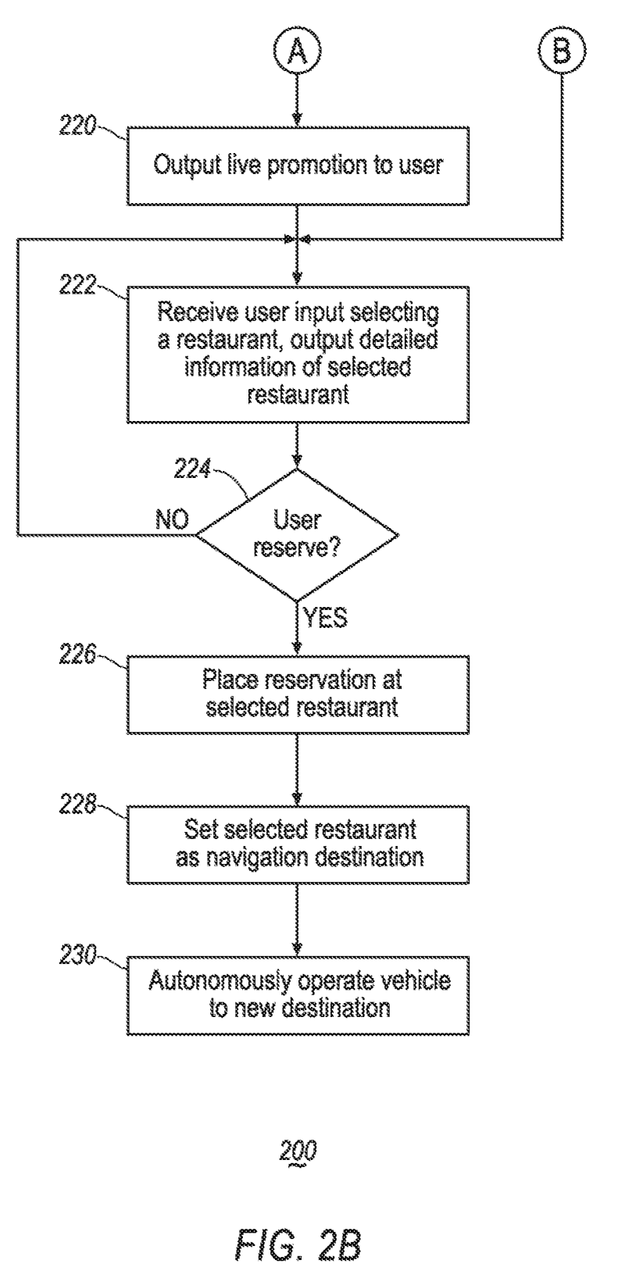

Referring to FIGS. 2A and 2B, an example flow diagram for a process 200 of one embodiment of the present disclosure is illustrated. In the present example, the user of the vehicle 102 may search for local food services, although other types of business services may apply to the process 200 under substantially the same principle. The process 200 may be implemented via the computing platform 104, the mobile device 128 or the combination thereof. For the simplicity of the illustration, the process 200 will be described with reference to the computing platform 104 below. At operation 202, the computing platform 104 receives a user input e.g. via the HMI controls 112 to use a "local food" feature as one of the vehicle applications 108. In response, the computing platform 104 activates the "local food" feature by launching the corresponding application 108. It is noted that the name "local food" is only an example for illustrative purposes. The feature/application may be assigned with any name related to the feature configured to locate businesses.

Responsive to the activation of the "local food" feature, at operation 204, the computing platform 104 identifies restaurants or food service providers who subscribed to such feature using the current location of the vehicle 102 and preconfigured geofence. The current location of the vehicle 102 may be obtained from the GNSS controller 124. The geofence may be configured in various ways. For instance, each restaurant entity 176 subscribed to "local food" feature may have a preconfigured geofence covering an area. If the location of the vehicle 102 is within the geofence of one or more restaurants, the computing platform 104 may qualify the one or more restaurants as candidates and retrieve information of the candidates from the cloud 168 via the TCU 172. As a few non-limiting examples, the information of the candidate restaurants 176 may include address, contact, type of food, menu, current waiting time, promotions or the like. Alternatively, some of the information of the candidate restaurant 176 may be previously stored in the storage 110 and the computing platform 104 may access such information without accessing the cloud 168. As an alternatively geofence configuration, the computing platform 104 may be further configured to qualify a candidate restaurant 176 based on a navigation route on which the vehicle 102 is traversing calculated via the navigation controller 122. The vehicle 102 may not be currently within a geofence of that subscribing restaurant 176. However, the vehicle 102 is anticipated to enter the geofence of the restaurant 176 based on the navigation route. Alternatively, the geofence may be defined around the vehicle 102 and/or the navigation route of the vehicle 102. The vehicle 102 may be configured to have its own geofence around the current location and planned route to identify/qualify candidate restaurants 176.

Responsive to identifying the one or more candidate restaurants 176, at operation 206, the computing platform 104 calculates a driving distance and corresponding driving time to each candidate restaurant 176 e.g. via the navigation controller 122. At operation 208, the computing platform 104 outputs the candidate restaurants 176 on the display. The candidate restaurants 176 may be displayed in the form of a list of icons sorted by distance, e.g. with the shortest distance on the top. Alternatively, the candidate restaurants 176 may be displayed on a map. Information of the candidate restaurants 176 may also be displayed to provide the user with a brief introduction about the restaurants. Since the screen space of the display 114 may be limited, the computing platform 104 may be configured to display only a brief introduction of the candidate restaurant, such as type of food, and the distance from the vehicle 102.

The present disclosure may allow businesses to provide customized promotions to different customers. In order to customize the promotions for different customers, the candidate restaurants 176 may need information about the vehicle users. At operation 210, the computing platform 104 collects the user information such as restaurant membership or customer credits/rewards via the mobile device 128. Additionally or alternatively, the user information may be stored in the storage 110 as a part of the vehicle data 126. The computing platform 104 may be further configured to collect vehicle occupancy information from various vehicle sensors (not shown) e.g. seat sensors, cameras of the like to determine the number of vehicle users to allow the restaurants further customize the promotions. For instance, a restaurant may be more likely to provide better discounts to a group consisting of multiple customers compared with the discounts offered for an individual customer. Once the user information and/or vehicle occupancy information are collected, at operation 212, the computing platform 104 asks for user permission to share the information with the candidate restaurants 176 via the cloud 168. If the user grants the permission, the process proceeds from operation 214 to operation 216, and the computing platform 104 uploads the user and vehicle occupancy information to the cloud 168 so that the candidate restaurants 176 can access the information. Otherwise, if the user decline to share the information for any reasons, the process skips operation 216 and proceeds to operation 218 directly.

With the user and vehicle occupancy information, candidate restaurant 176 may be able to provide customized promotions to the user of the vehicle 102. Sometime, the candidate restaurant 176 may be willing to provide promotions to the customers without receiving the user information of the vehicle 102. If customized promotions are provided by one or more candidate restaurants 176, the promotions may be sent to the vehicle 102 via the cloud 168. Responsive to receiving the customized promotion, the process proceeds from operation 218 to operation 220 to output the customized promotion. For instance, the customized promotion may be in the form of a text message such as "The manager is offering you a further 20% discount," or "we understand you have five people travelling together. How about a dinner for five for X amount of dollar?" The text message may be output via the display 114 as a pop-up message. Alternatively, the customized promotion may be provided in the form or a digital image, which may be presented via the display 114 in the same manner. Alternatively, the customized promotion may be a voice message and the computing platform 104 may play the voice message via the speaker 118. Alternatively, the customized promotion may be provided as any combination of the above-mentioned forms.

At operation 222, responsive to detecting a user input to select one of the candidate restaurants, the computing platform 104 output detailed information of the selected restaurant. The detailed information may further include current waiting time, contact, menu, options for reservation or the like in addition to the brief introduction displayed previously. The interface may be configured to allow the user to reserve a seat with the restaurant directly via the computing platform 104, e.g. by pressing a button. At operation 224, responsive to detecting the user input to reserve a seat, the process proceeds to operation 226 and the computing platform 104 places a reservation with the place at the selected restaurant 176 via the cloud 168. At operation 228, the computing platform 104 sets the selected restaurant 176 as the navigation destination via the navigation controller 122 to direct the vehicle 102 to the selected restaurant 176. In case that the vehicle 102 is provided with autonomous driving features, the process may proceed to operation 230 and the computing platform 104 operates the vehicle 102 to the new destination via the autonomous driving controller 178.

The operations of process 200 may be applied to various situations. For instance, with reference to FIG. 3, an example diagram 300 of one embodiment of the present disclosure is illustrated. With continuing reference to FIGS. 1 and 2, diagram 300 illustrates an example in which the vehicle 102 traveling on a route 302 searches for food service providers using the "local food" application 108. The route 302 may be a navigation route planned via the navigation controller 122. Alternatively, the route 302 may be planned via the navigation controller 150 of the mobile device 128 in communication with the computing platform 104 via the wireless connection 130. Alternatively, the route 302 may be an anticipated route determined by the computing platform 104 using various data such as the current location of the vehicle 102, historic vehicle routes or the like.

Figure 3:
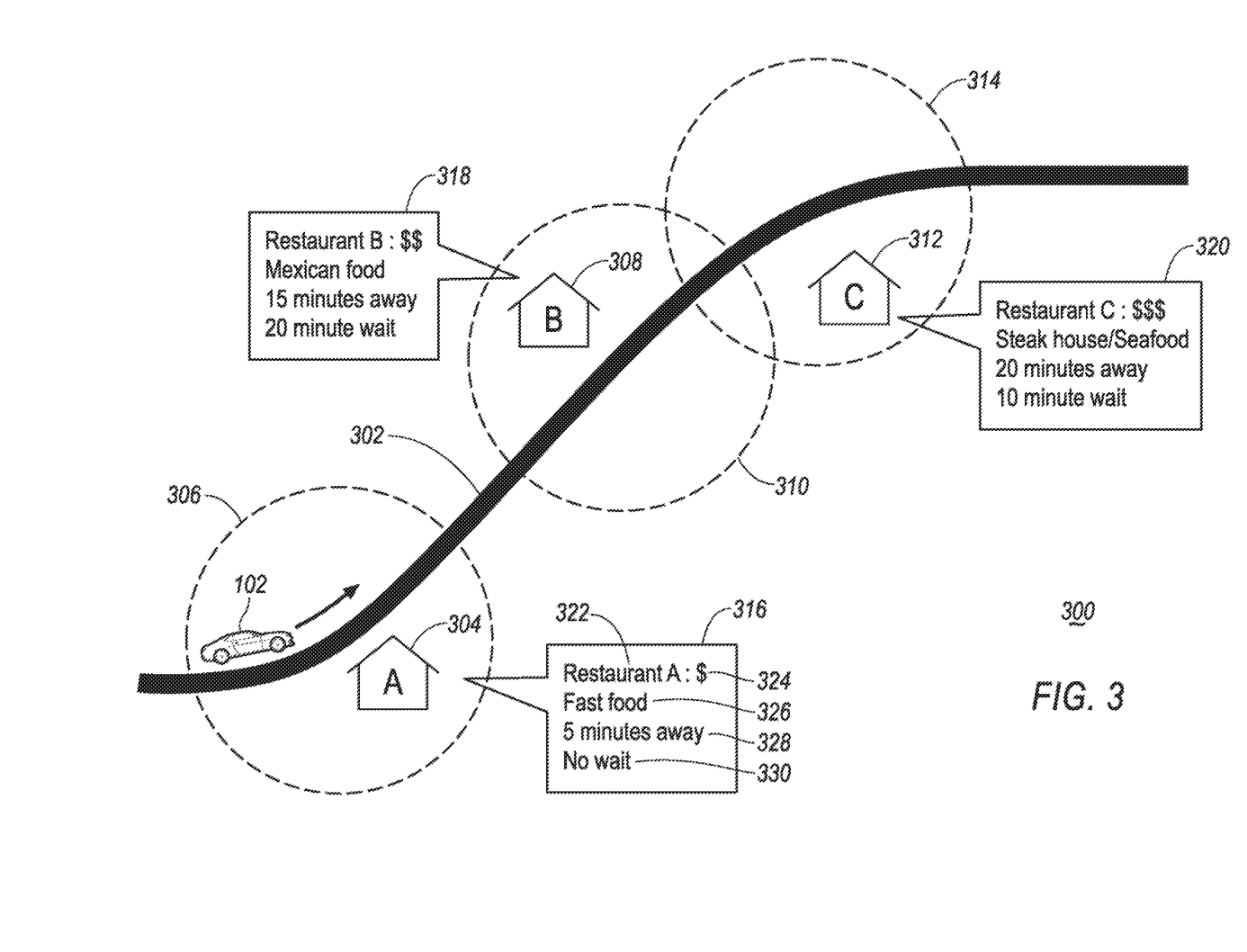
FIG. 3 illustrates an example diagram of one embodiment of the present disclosure.

In the present example, there may be totally three restaurants or food service providers 176 along the route 302. Restaurant A 304 serving fast food is about 5 minutes away from the current location of the vehicle 102 and currently there is no wait. Restaurant A 304 may have a predefined geofence 306 within which the vehicle 102 is currently located. The geofence 306 may be of any shape with any size. The shape and size of the geofence 306 may be based on a level of membership that the restaurant A is subscribed to the "local food" feature 108. For instance, premium members paying a high membership fee may be assigned with a geofence covering a larger area and/or more popular/favorable area (e.g. a highway with a lot of traffic) as compared with regular members paying a low membership fee. Similarly, the "local food" feature 108 may be configured to open to public businesses without subscription but the geofence for public businesses may be limited. Since the current location detected via the GNSS controller 124 indicates the vehicle 102 within the geofence 306, the computing platform 104 identifies and qualifies the restaurant A 304 as a candidate.

The computing platform 104 may be further configured to identify candidate restaurants using the route 302. For instance, restaurant B 308 may have a geofence 310, and restaurant C 312 may have a geofence 314. Although the current location of the vehicle 102 is not within either the geofence 310 of restaurant B 308 or the geofence 314 of restaurant C 312, the computing platform 104 may qualify both restaurant B 308 and restaurant C 312 using the route 302 which passes through the geofence 310 and the geofence 314. Driving times to candidate restaurants 176 may be calculated. Additionally, information about the candidate restaurants 176 such as current waiting time may be obtained from the cloud 168.

The diagram 300 as illustrated in FIG. 3 may be output via the display 114 in an interactive manner to provide the vehicle user with a more direct visual presentation. Each qualified candidate restaurant 176 may be associated with a dialog box to provide information about the restaurant. For instance, restaurant A 304 may be associated with a dialog box 306, the restaurant B 308 may be associated with a dialog box 318, and the restaurant C 312 may be associated with a dialog box 320. Taking the dialog box 316 for instance, the dialog box 316 may include a restaurant name entry 322 (i.e. "Restaurant A"), a price range entry 324 (e.g. more "$" indicate pricier food/service), a food type entry 326 (i.e. "Fast food"), a driving time entry 326 (i.e. "5 minutes away"), and/or a waiting time entry 330 (i.e. "No wait"). Similarly, both the dialog box 318 and the dialog box 320 may include similarly entries to provide the user with the information about each associated restaurant 176. It is noted that the entries illustrated with reference to FIG. 3 are merely a few non-limiting examples. Other entry configurations may be used in each dialog box depending on various factors such as the screen size of the display 114, availabilities of the restaurant information or the like. Additionally, the computing platform 104 may be further configured to display customized promotions in the dialog box responsive to receiving the promotions via the TCU 172. Additionally, the computing platform 104 may be configured to support a filter feature and the user may filter out candidates based on his/her preferences. For instance, the user may preconfigure the filter to block fast food in the food type entry 326, in which case restaurant A 304 will be disqualified as a candidate. The user may user the price range entry 324 to filter out any candidate with three or more "$." Under such configuration, restaurant C 312 may be blocked.

Figure 4:
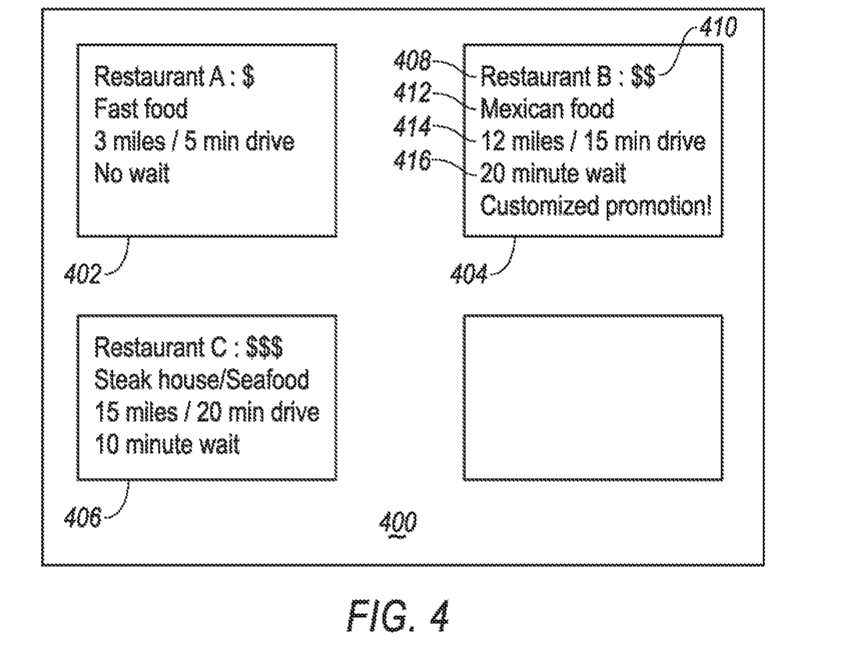
FIG. 4 illustrates an example diagram for an interface of one embodiment of the present disclosure.

Referring to FIG. 4, an example diagram for an interface 400 of one embodiment of the present disclosure is illustrated. The interface 400 may be displayed via the display 114 as an alternatively interface to the diagram 300 as illustrated with reference to FIG. 3. The interface 400 may include multiple icons each presenting information of a candidate restaurant 176. For instance, with continuing reference to FIGS. 1 to 3, a first icon 402 introducing restaurant A 304, a second icon 410 introducing restaurant B 308, and a third icon 406 introducing restaurant C 312 may be displayed in the interface 400. Entries displayed in each icon may be substantially the same as those displayed in the dialog boxes illustrated with reference to FIG. 3. Taking the second icon 410 for instance, the icon 410 may include a restaurant name entry 408 (i.e. "Restaurant B"), a price range entry 410 (i.e. "$$"), a food type entry 412 (i.e. "Mexican food"), a driving distance/time entry 414 (i.e. "12 miles/15 mins drive"), a waiting time entry 146 (i.e. "20 mins wait"), and/or a customized promotion entry 418. The computing platform 104 may be configured to allow the user to select a candidate restaurant 176 and access more detailed information. The computing platform 104 may be configured to receive a user input selecting an icon via the HMI controls 112. Alternatively, in case that the display 114 is provided with touch screen features, the user may select the intended candidate restaurant 176 by touching the corresponding icon. Alternatively, in case that the diagram 300 is displayed in lieu of the interface 400, the computing platform 104 may be configured to allow the user to select the intended restaurant by touching the associated dialog box to access more detailed information and options.

Figure 5:
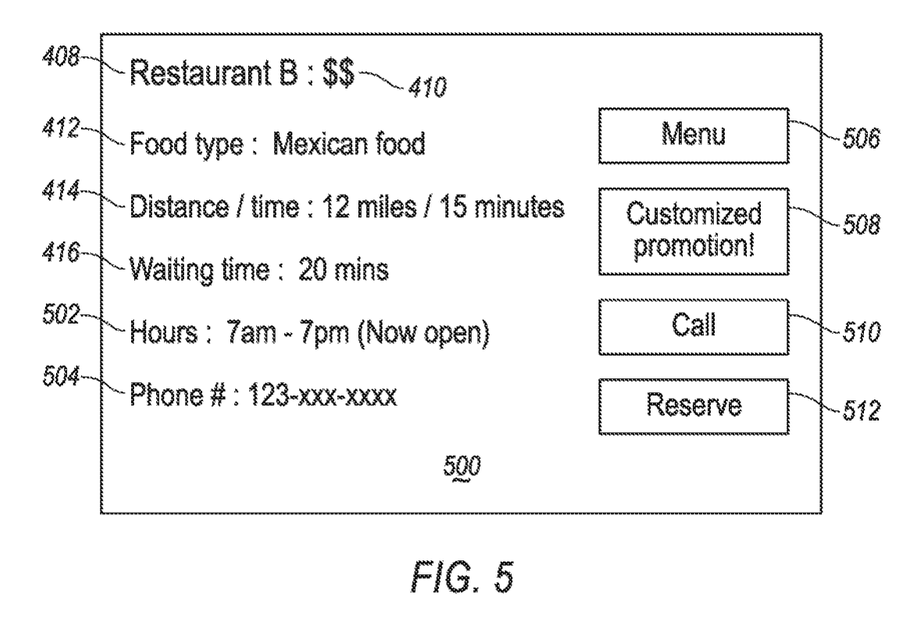
FIG. 5 illustrates an example diagram for another interface of one embodiment of the present disclosure.

Referring to FIG. 5, an example diagram for an interface 500 presenting more detailed information of one embodiment of the present disclosure is illustrated. With continuing reference to FIGS. 3 and 4, the interface 500 illustrates more detailed information about the restaurant B 308 responsive to the computing platform 104 receiving a user input. Compared with the dialog box 316 and the icon 410 associated with restaurant B, the interface 500 provides more detailed information and options for the user to choose from. For instance, in addition to the entries displayed in the interface 400, interface 500 may further include an hours entry 502, and/or a phone number entry 504. The interface 500 may further include options, e.g. in the form of buttons, configured launch further actions responsive to receiving user input. The interface 500 may include a menu option 506 configured load a menu of the restaurant B 308 obtained via the cloud 168 or previously stored in the storage 110. The interface 500 may include a customized promotion option 508, configured to present the user with the customized promotion received from the restaurant B 308 via the cloud 168 the customized promotion may be received in various forms and format. For instance, the customized promotion may include a text message, or alternatively an audio message. Responsive to detecting the user selecting the customized promotion option 508, the computing platform 104 may output the customized promotion in an appropriate form. The interface 500 may further include a call option 510 configured to allow the user to contact restaurant B 308 via the TCU 172 or the mobile device 128 connected to the computing platform 104 via the wireless connection 130. The interface 500 may further include a reserve option 512 configured to allow the user to reserve a seat via the system. Using restaurant B 308 for instance, it may take the vehicle 102 fifteen minutes to drive to the location restaurant B 308 while the current waiting time is about twenty minutes. If the user reserves a seat via the system by choosing the reserve option 512, the user may be put in the line for restaurant B 308 immediately. When the vehicle 102 arrives at restaurant B 308 after fifteen minutes drive, the user may only need to wait about five minutes to be serviced. The computing platform 104 may be configured to compare the waiting time 416 with the driving time 414, and make recommendations to the vehicle user based on the comparison results. For instance, the computing platform 104 may recommend a restaurant if the waiting time 416 is not substantially longer than the driving time (e.g. within five minutes threshold).

Although the present disclosure is illustrated using the example of restaurants or food service providers, it is noted that the principle of the present disclosure may be applied to other types of business. Additionally, although the present disclosure is illustrated primarily with reference to the computing platform 104 of the vehicle 102, it is noted that the process and embodiment of the present disclosure may be implemented using other devices such as the mobile device 128 in additional to the computing platform 104, or in lieu of the computing platform 104.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
   a sensor, programmed to collect a vehicle occupancy;
   a telematics control unit (TCU) programmed to communicate with a wireless network; and
   a computer, programmed to
   responsive to detecting a vehicle location within a geofence of a first entity, qualify the first entity as one of business candidates to display to a screen,
   collect a business membership of a vehicle user from a mobile device wirelessly connected to the vehicle,
   responsive to receiving a user permission, send the vehicle occupancy and the business membership to one or more of the business candidates via the TCU,
   responsive to receiving a promotion from one or more of the business candidates, output the promotion, wherein the promotion is customized to the vehicle occupancy and the business membership, and
   responsive to receiving a user input, place a reservation to one of the business candidates.

2. The vehicle of claim 1, wherein the computer is further programmed to:
   retrieve information of the first entity from a cloud including at least one entry of: a food type, a price range, a waiting time, hours of business, a menu, or a contact number; and
   output one or more of entry of the information of the first entity.

3. The vehicle of claim 2, wherein the computer is further programmed to:
   calculate a driving time to the first entity;
   compare the driving time to the first entity with the waiting time of the first entity; and
   recommend the first entity to a vehicle user based on a comparison result indicative of a difference of the waiting time of the first entity and the driving time to the first entity is not greater than a predefined threshold.

4. The vehicle of claim 1, wherein the computer is further programmed to:
   qualify a second entity as one of business candidates based on a vehicle navigation route passing through a predefined geofence of the second entity.

5. The vehicle of claim 4, wherein the computer is further programmed to:
   wherein the vehicle navigation route is calculated based on historic routes of the vehicle.

6. The vehicle of claim 1, wherein computer is further programmed to:
   displaying a plurality of business candidates each associated with a dialog box on a map, the dialog box includes at least one of: a restaurant name, price range, food type, driving time from current location, or current waiting time.

7. The vehicle of claim 6, wherein the computer is further programmed to:
   responsive to detecting selecting one of the business candidates, additionally output detailed information of selected business candidate including at least one of: business hours, a contact number, a menu, an option to call, or an option to reserve a seat.

8. A method for a vehicle, comprising:
   responsive to detecting a vehicle location within a geofence of a first business entity, qualifying the first business entity as one of business candidates;
   displaying one or more business candidates on a display;
   collecting a vehicle user information from a mobile device wirelessly connected to the vehicle, the user information includes a business membership of the vehicle user;
   sending the vehicle user information to one or more of the business candidates via a cloud;
   collecting vehicle occupancy information via a sensor;
   responsive to receiving a user permission, sending the vehicle occupancy information to one or more of the business candidates via the cloud;
   responsive to receiving a customized promotion from the one or more of the business candidates, outputting the customized promotion to the vehicle user, wherein the customized promotion is customized to the business membership; and
   responsive to receiving a user input place a reservation to one of the business candidates.

9. The method of claim 8, further comprising:
qualifying a second business entity as one of business candidates based on a vehicle navigation route passing through a predefined geofence of the second entity.

10. The method of claim 9, wherein the vehicle navigation route is calculated based on historic routes of the vehicle.

11. The method of claim 9, further comprising:
retrieving information of the second business entity from the cloud including at least one entry of: a food type, a price range, a waiting time, hours of business, a menu, or a contact number; and
output one or more of entry of the information of the first entity.

12. The method of claim 11, further comprising:
calculating a driving time to the second business entity from a current location; and
displaying the driving time to the second business entity and the waiting time of the business entity on a same screen.

13. The method of claim 12, further comprising:
comparing the driving time to the second business entity with the waiting time of the second business entity; and
recommend the second business entity based on a comparison result indicative of a difference of waiting time of the second business entity and the driving time to the second business entity is not greater than a predefined threshold.

14. A non-transitory computer readable medium including instructions, when executed by a processor of a vehicle, making the vehicle to:
responsive to detecting a business entity is located within a geofence defined by the vehicle and by a navigation route of the vehicle, qualify the business entity as one of business candidates;
display one or more business candidates on a display;
collect a business membership of a vehicle user from a mobile device wirelessly connected to the vehicle;
send the business membership to one or more of the business candidates;
collect vehicle occupancy information via a sensor;
responsive to receiving a user permission, send the vehicle occupancy information to a cloud to share with one or more of the business candidates;
responsive to receiving a promotion customized to the business membership from one or more of the business candidates, output the promotion; and
responsive to receiving a user input; place a reservation to one of the business candidates.

15. The non-transitory computer readable medium of claim 14, further including instructions, when executed by a processor of a vehicle, making the vehicle to:
retrieve information of the business entity from a cloud including at least one entry of: a food type, a price range, a waiting time, hours of business, a menu, or a contact number;
calculate a driving time to the business entity from a current location; and
display the driving time to the business entity and the waiting time of the business entity on a same screen.

16. The non-transitory computer readable medium of claim 15, further including instructions, when executed by a processor of a vehicle, making the vehicle to:
compare the driving time to the business entity with the waiting time of the business entity; and
recommend the business entity based on a comparison result indicative of a difference of waiting time of the business entity and the driving time to the business entity is not greater than a predefined threshold.

* * * * *